UNITED STATES PATENT OFFICE.

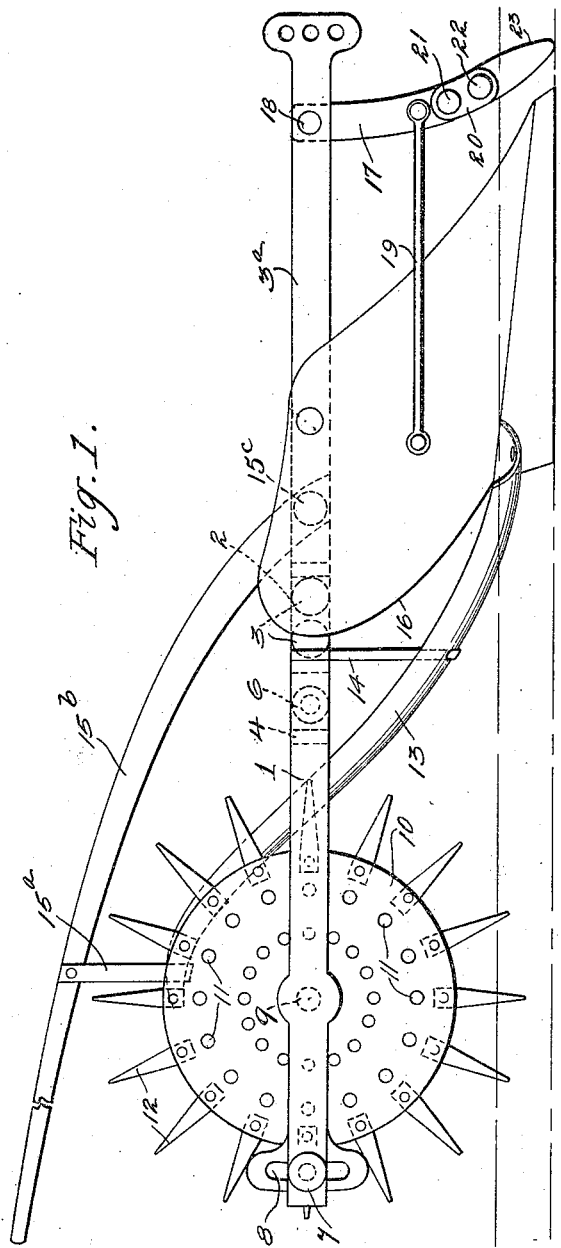

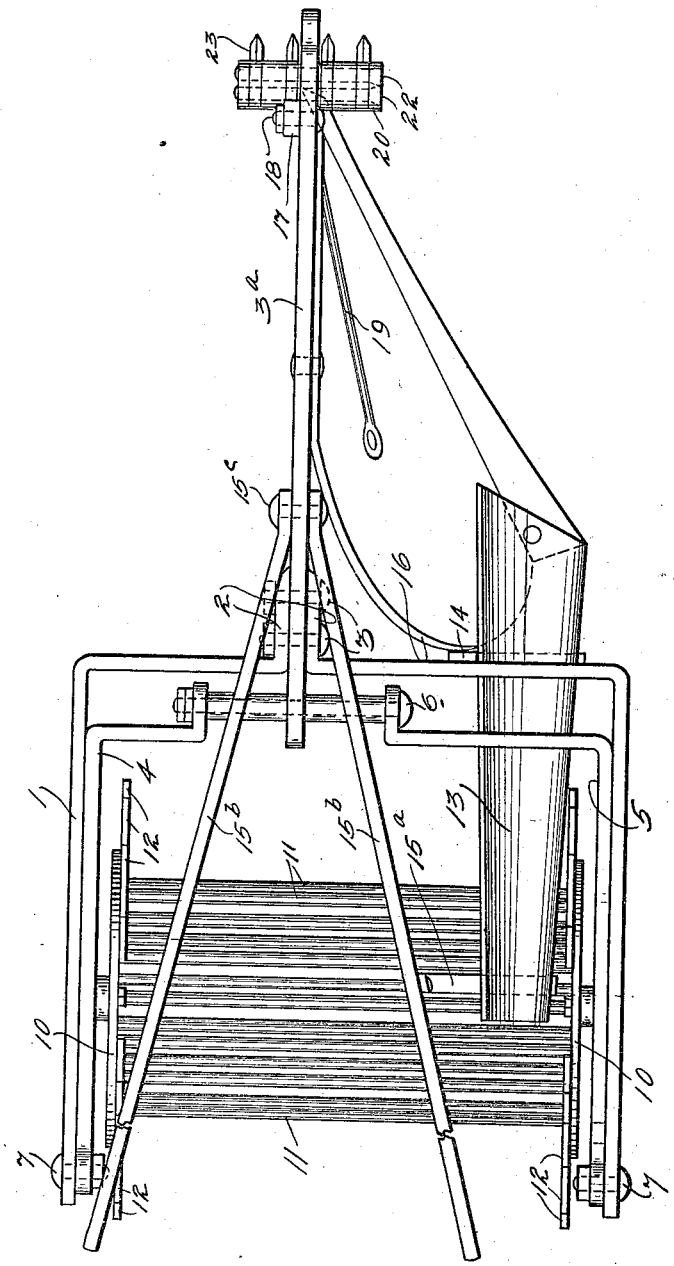

OTTO GERHARD FORCHHEIM, OF ROSEVEAR, ALBERTA, CANADA.

AGRICULTURAL MACHINE.

1,281,546.
Specification of Letters Patent. Patented Oct. 15, 1918.

Application filed March 8, 1917. Serial No. 153,434.

*To all whom it may concern:*

Be it known that I, OTTO GERHARD FORCHHEIM, a subject of the Emperor of Germany, residing at Rosevear, in the Province of Alberta, in the Dominion of Canada, have invented certain new and useful Improvements in Agricultural Machines, of which the following is a specification.

This invention relates to improvements in agricultural machines and more particularly to a machine adapted particularly for the accomplishment of dry farming. The machine is designed to thoroughly break, harrow and pulverize the soil to leave the same in a perfect condition for seeding. A further object is to provide a machine of this class that is of simple construction, easy to operate by one person and that is not expensive to manufacture.

With the foregoing and other objects in view the invention consists in the combination and arrangement of parts to be hereinafter fully described in this specification, pointed out in the appended claims and illustrated in the accompanying drawings which form a part of the specification and in which—

Figure 1 is a side elevation of a machine constructed according to my invention.

Fig. 2 is a top plan view of the same.

Like reference numerals denote corresponding parts in both views.

The machine comprises a substantially U-shaped frame 1 which may be of 2-piece formation, the base being formed with offsets 2 connected by bolts 3 which also secure the draft beam 3ᵃ to the frame. Within the said frame 1 is another frame comprising sections 4, 5 connected by the retaining bolt 6 which is fulcrumed upon the draft beam 3ᵃ; the frame 4, 5 is also substantially U-shaped and connection between said frames is at their open ends where bolts 7, carried by the frame 1, are disposed in the elongated slots 8 of the frame 4, 5; an axle 9 of the rotary drum 10 is journaled in frame 4, 5 and said drum is provided with the spokes or cross bars 11 which connect the drum ends, and with the spikes 12 which are carried about the periphery of each drum end.

A conveyer 13 connected to the frame 1 by brace 14, and by brace 15ᵃ to the handles 15ᵇ which are connected by bolt 15ᶜ, is of channeled formation and leads from the ground up under the frames 1 and 4, 5 to a point above the spokes of the drum 10 and is adapted to convey the soil scooped out of the earth into said drum. A plow blade 16 is bolted to the draft beam 3ᵃ and to the said conveyer and is adapted to break the earth in the usual manner and convey the same, as broken, to the said conveyer. A bar 17 connected by bolt 18 to the forward end of the draft bar 3ᵃ is connected by rod 19 with the plow blade 16 and serves to retain said rod in an operative position with relation to said plow blade, the said position being one substantially at right angles to the draft bar 3ᵃ. A casting 20 formed of a plurality of sections secured together by the bolts 21, 22 is secured to said bar 17 by the bolt 21 and teeth 23 are carried by the several sections of the said casting 20, each section preferably carrying one tooth 23.

In operation the teeth 23 break the earth in advance of the plow blade 16 thus facilitating the work of said blade. The blade next encounters the earth and carries a portion of it to and upon the conveyer 13 up which the earth or soil is forced and from which it falls upon the drum 10. Any clods of earth falling thereupon are broken by the action of the drum spokes and dropped again to the ground. The spurs 12 rotated by the action of the drum further break or harrow the soil. By loosening the bolts 7 the frame 4, 5 may be raised or lowered upon the bolt 6 with relation to the frame 1 thus causing the spikes 12 to make shallow or deep incisions in the ground.

What is claimed is:—

1. In an agricultural machine, an outer U-shaped frame, an inner U-shaped frame formed with vertical elongated slots in its ends, adjustable connection between the ends of the outer frame and the slotted ends of the inner frame, a rotary drum, peripheral spikes on said drum, an axle for said drum journaled in the inner frame, a plow blade, a beam connecting said frames and plow blade, and a conveyer between said plow blade and said rotary drum.

2. In an agricultural machine, an outer U-shaped frame, an inner U-shaped frame, adjustable connection between the ends of said frames, a rotary drum journaled in said inner frame, a plow blade, a beam connecting said frames and plow blade, and a conveyer between said plow blade and rotary drum.

3. In an agricultural machine, a draft beam, a sectional U-shaped frame, bolt connection engaging said frame sections and said draft beam, an inner sectional U-shaped frame, a bolt connecting said frame sections and said draft beam, bolt connection between the outer ends of said frames, a rotary drum journaled in said inner frame, a plow blade on said beam, and a conveyer between said plow blade and rotary drum.

In testimony that I claim the foregoing as my own I have hereto affixed my signature in the presence of two subscribing witnesses.

OTTO GERHARD FORCHHEIM.

Witnesses:
WOLFGANG FALLBACHER,
OTTO HAUSSMANN.

Copies of this patent may be obtained for five cents each, by addressing the "Commissioner of Patents, Washington, D. C."